May 26, 1964  R. R. WILLIAMSON  3,134,976
PULSE TIMING SYSTEM
Filed Dec. 20, 1955  3 Sheets-Sheet 3
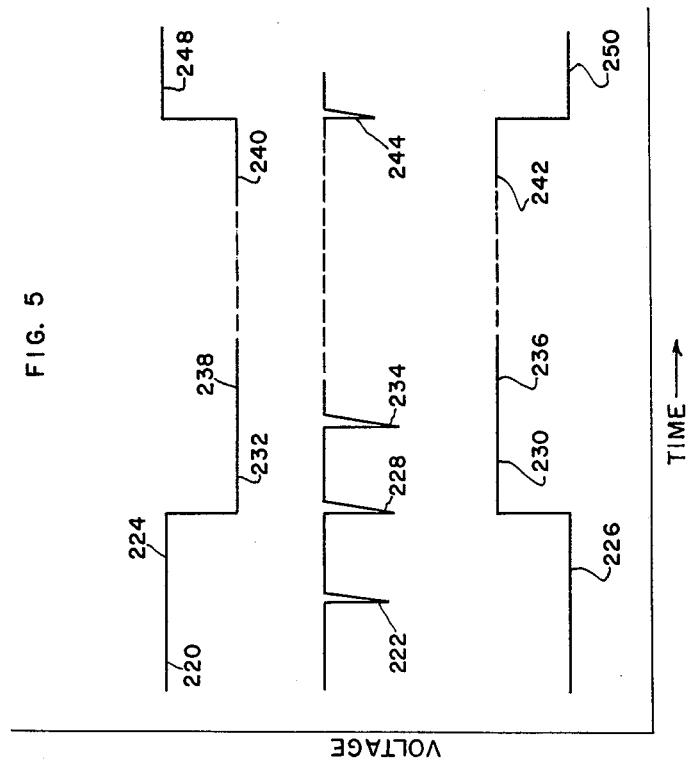
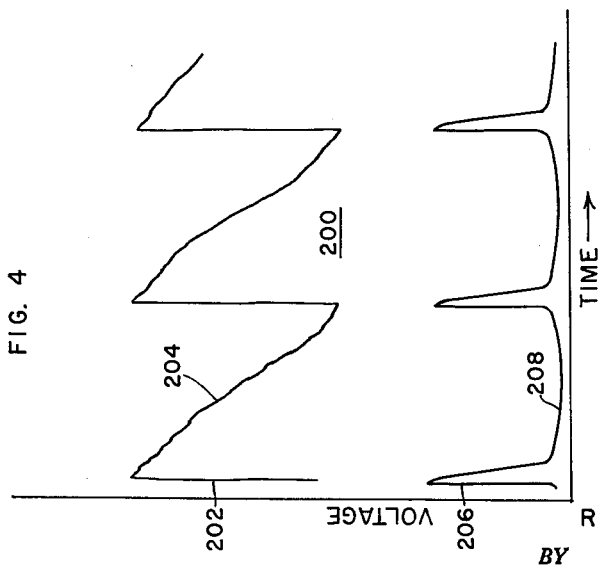
INVENTOR.
ROBERT R. WILLIAMSON
BY
Theodore H. Lassagne
ATTORNEY

United States Patent Office 3,134,976
Patented May 26, 1964

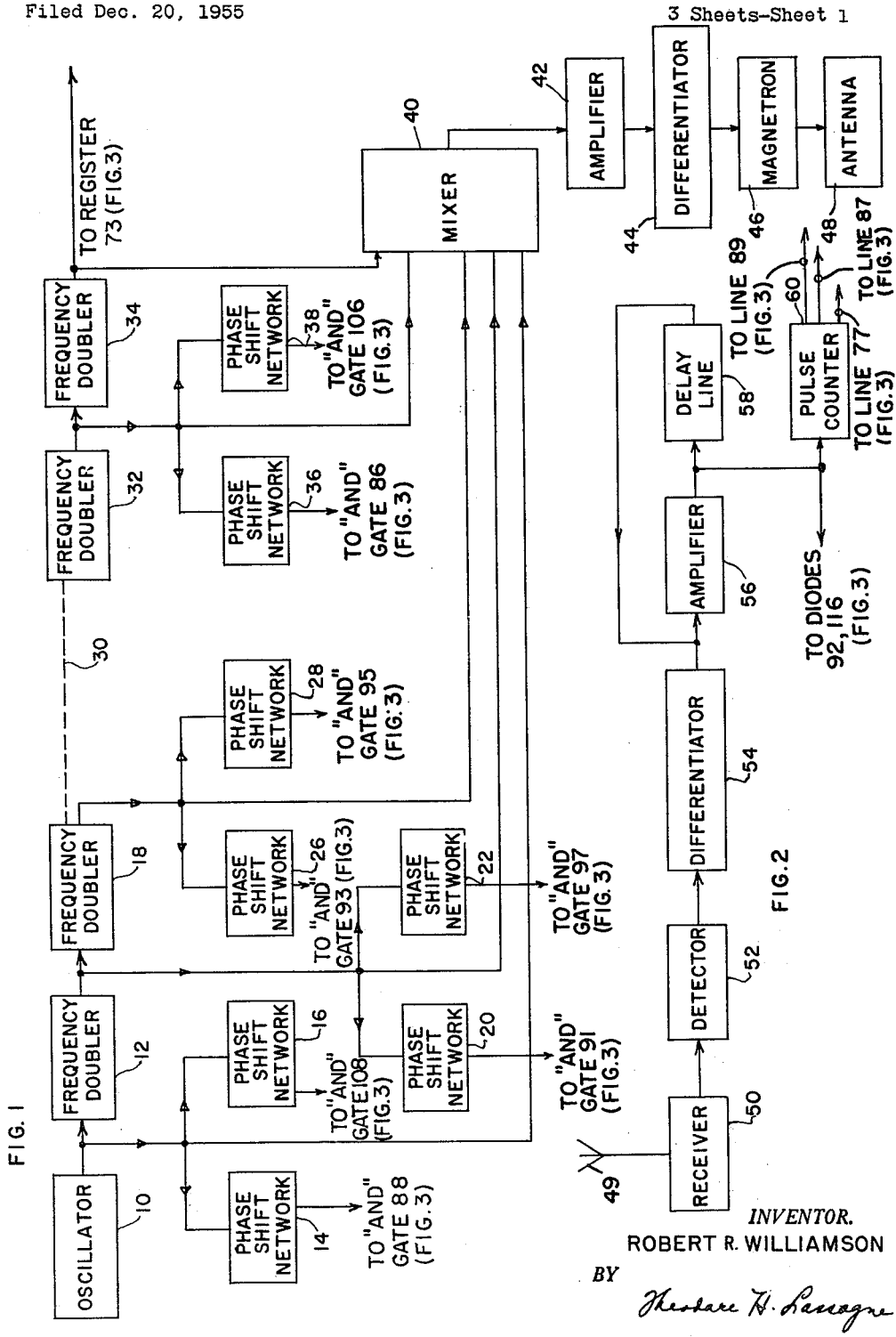

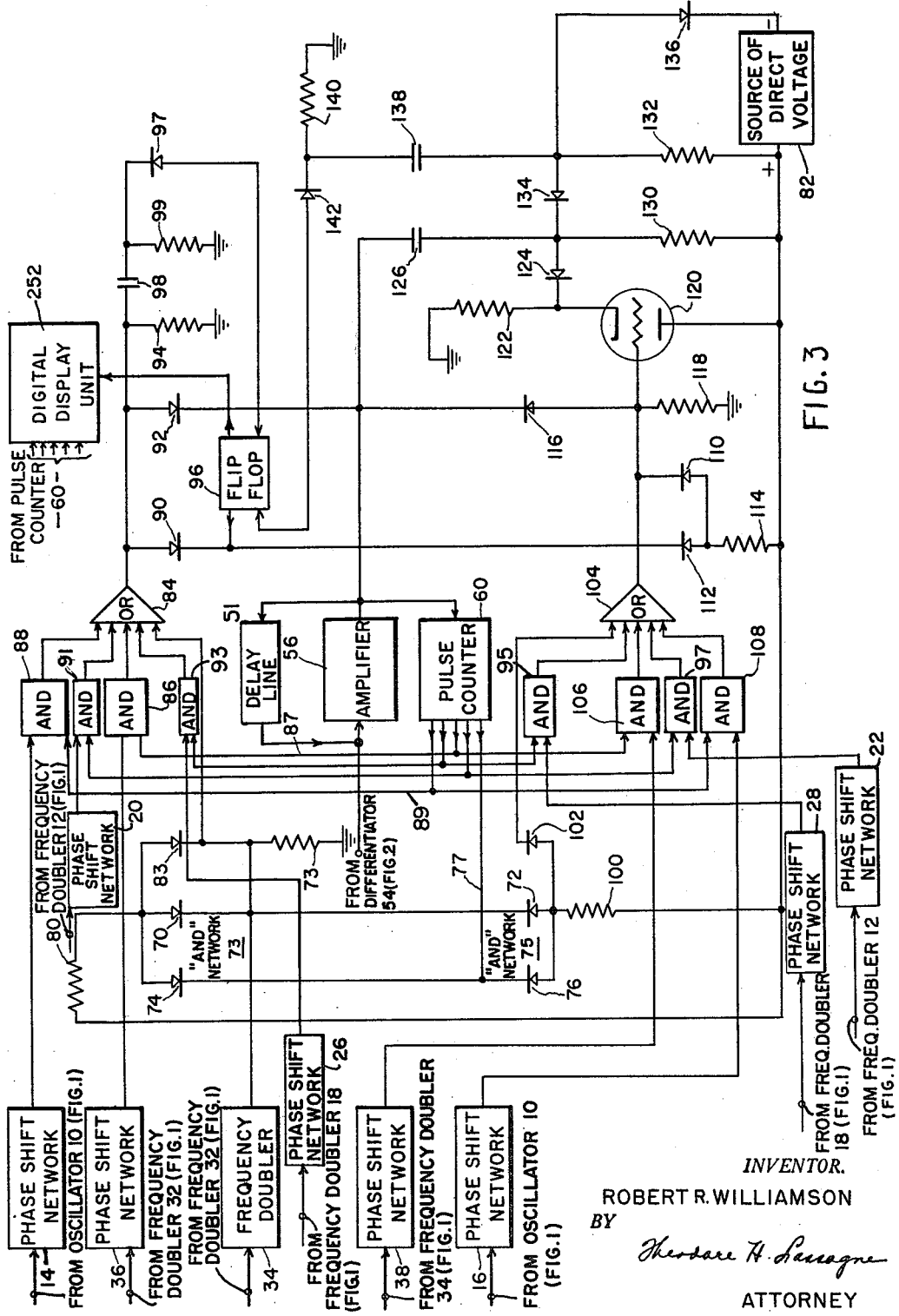

3,134,976
PULSE TIMING SYSTEM
Robert R. Williamson, Sunland, Calif., assignor to General Precision, Inc., a corporation of Delaware
Filed Dec. 20, 1955, Ser. No. 554,158
20 Claims. (Cl. 343—13)

This invention relates to a timing system and more particularly to a system for accurately determining the time between a transmitted pulse and the reflections of the pulse back to the transmitting position from a distant object. The embodiment of the invention is particularly adapted to be used for measuring the distance between the transmitter and a distant object as in radar systems.

Various apparatus has been built in the past number of years for using pulses to measure the distance between a transmitting position and a distant object. In such apparatus, the pulses are transmitted from the transmitting position and are reflected as echoes from the distant object back to the transmitting position. By measuring the time between the transmission and the reception of pulses, indications as to the distance between the transmitting position and the removed object can be obtained.

The apparatus now in use starts to measure time from the instant that the pulse is transmitted toward the distant object. The time is measured on an analogue basis by obtaining a voltage proportional to the time. The analogue voltage is obtained by triggering a variable delay line into a state of activation at the time of pulse transmission and by de-activating the delay line at the time of pulse reception. This method of determining time has failed to meet the need for increased accuracies which are required for determining the distance between the transmitting position and the removed object. The indications are somewhat inaccurate since sensitive differences in the amplitude of an analogue voltage cannot be easily measured.

In order to produce high accuracies such as those including errors of less than one yard, it has been recognized that digital techniques should be used. In such digital techniques, a plurality of signals would have to be produced to represent on a composite basis the time between the transmission and reception of the pulses. Various attempts have been made to use digital techniques but such systems have not been successful. One problem has been presented by the requirement that signals having frequencies as high as 30 megacycles have to be used in such previously proposed systems. Furthermore, stages stages having wide band characteristics have to be used in order to pass signals in the range of 0 to 30 megacycles for the production of a plurality of signals representing the output quantity in digital form. By using stages with wide band characteristics, sensitivity in the response of the stages becomes dulled. This necessitates the use of additional amplifier stages and increases the cost, weight, complexity and power consumption of the apparatus. It also hinders the use of transistors in such apparatus since transistors have relatively narrow band characteristics.

This invention provides a system for determining the distance between a transmitting position and a distant object with accuracies superior to those which have been obtained. The invention produces such accuracies by using digital techniques on a practical basis to measure and indcate the time between the transmission and reception of pulses. The invention produces first signals at a fundamental frequency and other signals which are harmonics of the fundamental frequency. The system then combines all of the signals to produce a composite signal having a sharp leading edge. This sharp leading edge is differentiated to produce a spiked signal for triggering a transmitter. When the transmitter is triggered, it sends an energy pulse toward a removed object for reflection from the removed object.

When the reflected pulse is received from the removed object, it is recirculated to produce a plurality of clock signals. At each clock signal, a test is made as to the phase of a different one of the signals having the fundamental and harmonic frequencies. The test is made by a particular digital converter such that ambiguities in the results of the test are eliminated. The results obtained from the test indicate in digtial form the time between the transmission of the pulse and the reflection of the pulse by the removed object back to the transmitting position.

The apparatus constituting this invention eliminates certain disadvantages which would be obtained by the use of other digital techniques. The apparatus requires only stages having narrow band characteristics to produce the triggering signals. This eliminates the need for the additional amplifier stages required in the prior apparatus and reduces the size, weight and power consumption of the apparatus. It also permits the use of transistors such that further considerable reductions in size, weight and power consumption can be obtained.

In the drawings:

FIGURE 1 is a circuit diagram, mainly in block form, somewhat schematically illustrating transmitting apparatus forming one part of this invention;

FIGURE 2 is a circuit diagram, mainly in block form, somewhat schematically illustrating receiving apparatus forming another part of the invention;

FIGURE 3 is a circuit diagram, partly in block form, somewhat schematically illustrating phase testing apparatus forming a third part of the invention and includes certain stages also shown in FIGURES 1 and 2;

FIGURE 4 illustrates curves representing composite timing signals produced by certain stages shown in the previous figures and further representing the use of these timing signals to produce a pulse for transmission, and FIGURE 5 illustrates curves representing the operation of the apparatus shown in FIGURE 3 in producing a plurality of signals representing in digital form the time between the transmission of a pulse and the reflection of the pulse back to the transmitting position.

In the embodiment of the invention shown in the drawings, signals from an oscillator 10 (FIGURE 1) are adapted to be introduced to a harmonic generator such as a frequency doubler 12. The oscillator 10 and the frequency doubler 12 are included in transmitting apparatus shown in FIGURE 1. The oscillator 10 may be a conventional oscillator such as a Hartley or Colpitts oscillator described on pages 480 to 484, inclusive, of Radio Engineers' Handbook by Frederick E. Terman and published by the McGraw Hill Book Company (First Edition, 1943). The doubler 12 may be a conventional circuit constructed in a manner similar to that disclosed on pages 458 to 462, inclusive, of said "Radio Engineers' Handbook" by Frederick E. Terman.

The signals from the oscillator 10 are also adapted to be introduced to a pair of phase shift networks 14 and 16. The phase shift networks 14 and 16 may be constructed in a number of different ways, for example as described on pages 949 and 950 of said Radio Engineers' Handbook, by Frederick E. Terman. The phase shift network 14 may operate on the signals from the oscillator 10 to shift the signals through a particular angle related to the frequency of the signals and related to the time from the reception of a pulse by the receiver 50 in FIGURE 2 to the formation of a particular clock signal. This will be described in detail subsequently. The phase shift provided by the network 16 may be different by a particular angle such as approximately 45 degrees relative to the phase shift provided by the network 14.

The signals from the frequency doubler 12 are introduced to a doubler 18 which may be constructed in a manner similar to that of the doubler 12. The signals from the frequency doubler 12 are also introduced to a pair of phase shift networks 20 and 22. The phase shift networks 20 and 22 may be constructed in a manner similar to the networks 14 and 16. The network 20 may operate to shift the signals from the doubler 12 through an angle related to the frequency of the signals and to the time from the reception of a pulse by the receiver 50 in FIGURE 2 to the formation of a particular clock signal. The phase shift provided by the network 22 may be different by a suitable angle such as approximately 45 degrees with respect to the phase shift provided by the network 20.

In like manner, the signals from the frequency doubler 18 are introduced to a frequency doubler (not shown) corresponding in construction and operation to the doubler 18. The signals from the doubler 18 also pass to phase shift networks 26 and 28 corresponding in construction and operation to the networks 20 and 22. The network 26 may operate to shift the signals from the frequency doubler 18 through an angle related to the frequency of the signals and to the time from the reception of a reflected pulse to the formation of a particular clock signal. The network 28 may provide a suitable phase shift such as approximately 45 degrees with respect to the phase shift provided by the network 26.

Frequency doublers may be cascaded through any desired number of stages in accordance with the accuracy required in the measurements as to the time between the transmitted and received pulses. This is indicated by broken lines 30 in FIGURE 1. In the final stages of the transmitting apparatus, the signals may be introduced to a frequency doubler 32 from the previous stage in the cascade arrangement. The signals from the frequency doubler 32 are in turn introduced to a frequency doubler 34 and to phase shift networks 36 and 38. The networks 36 and 38 may have the same phase relationship as the networks 14 and 16, the networks 20 and 22 and the networks 26 and 28.

The signals from the oscillator 10 and the frequency doublers such as the doublers 12, 18, 32 and 34 are introduced to a linear mixer 40 and the output from the mixer may be applied to amplifiers 42. References to suitable mixers of this type may be found, for example, in the Radiatron Designer's Handbook, Langford Smith (Fourth Edition) 1952, pages 799-805, this handbook being reproduced and distributed by the RCA Victor Division of the Radio Corporation of America, Harrison, New Jersey. The signals from the amplifiers 42 pass in turn to a differentiator 44 which may be constructed in a manner similar to the differentiators which are shown in FIGURE 3 and which will be described in detail subsequently.

The differentiator 44 may be coupled to a magnetron indicated in block form 46. Although the magnetron 46 is shown in FIGURE 1, other apparatus such as a klystron may also be used. By coupling the differentiator 44 to the magnetron 46, the magnetron may be triggered into oscillation upon the production of a particular signal in the differentiator 44. The signals from the magnetron 46 are introduced to an antenna 48 for transmission by the antenna on a wireless basis to a distant object.

The signals reflected from the distant object are received at the transmitting position by the antenna 49 of a receiver 50 shown in block form in FIGURE 2. The signals are introduced to a detector 52, which demodulates the signals and passes the signals to a differentiator 54. The differentiator 54 is coupled to an input terminal of an amplifier 56, another input terminal of which receives the output signals from a delay line 58. The output terminal of the amplifier 56 is connected to the input terminal of the delay line 58 and to a pulse counter 60.

The frequency doubler 34, the phase shift networks 36 and 38, and the other frequency doublers and phase shift networks of FIGURE 1 are included in the circuitry shown in FIGURE 3. The circuitry shown in FIGURE 3 is shown somewhat schematically since similar circuitry is shown and described in detail in co-pending application Serial Number 467,154 filed November 5, 1954, by Leo P. Retzinger, Jr.

The signals from the frequency doubler 34 are introduced to the cathodes of diodes 70 and 72. The cathodes of the diodes 70 and 72 have a common connection with one terminal of a resistance 73, the other terminal of which is grounded. The diode 70 is included in an "and" network 73 with a diode 74, and the diode 72 is similarly included in an "and" network 75 with a diode 76. The cathodes of the diodes 74 and 76 have a common connection through a line 77 with one of the output terminals in the pulse counter 60 (also shown in FIGURE 2).

A resistance 80 is connected between the positive terminal of a source 82 of direct voltage and the plates of the diodes 70 and 74. The resistance 80 is also connected between the source 82 and the plate of a diode 83. The cathode of the diode 83 has a common connection with an input terminal of an "or" network 84, other input terminals of which are connected to "and" networks 86, 88, 91 and 93. The "and" network 86 has voltages applied to its input terminals through a line 87 from a second terminal of the pulse counter 60 and directly from the phase shift network 36. Similarly, voltages are applied to input terminals of the "and" network 88 from the phase shift network 14 and through a line 89 from a third terminal of the counter 60. In like manner, voltages are applied to the input terminals of the "and" network 91 from the phase shift network 20 and from a fourth output terminal of the pulse counter 60. Voltages are also applied to the input terminal of the "and" network 93 from the phase shift network 26 and from a shift output terminal of the counter 60. The "and" networks 86 and 88 may be constructed in a manner similar to the "and" network formed by the diodes 70 and 74.

The output signals from the "or" network 84 pass to the plates of diodes 90 and 92 and to one terminal of a resistance 94 having its other terminal grounded. The cathode of the diode 90 receives the voltages on the left output terminal of a flip-flop 96 and the cathode of the diode 92 has signals applied to it from the amplifier 56 also shown in FIGURE 2.

The flip-flop 96 may be constructed in a conventional manner such as is shown and described in co-pending application Serial Number 467,154, filed November 5, 1954, by Leo P. Retzinger, Jr. As such, the flip-flop 96 may be provided with two output terminals shown as left and right output terminals in FIGURE 3. The flip-flop 96 may also be provided with two input terminals shown as left and right input terminals in FIGURE 3. The right input terminal of the flip-flop 96 is shown in FIGURE 3 as being connected to the plate of a diode 97. The cathode of the diode 97 is connected to the common terminal between a capacitance 98 and a resistance 99. The capacitance 98 and the resistance 99 are in series across the resistance 94.

Just as the plates of the diodes 70 and 74 have positive voltages applied to them from the source 82 through the resistance 80, positive voltages are applied through a resistance 100 to the plates of the diodes 72 and 76 and to the plate of a diode 102. The cathode of the diode 102 is connected to an "or" network 104, which also receives signals from "and" networks 95, 97, 106 and 108. Connections are made to input terminals of the "and" network 106 from the phase shift network 38 and through the line 87 from the second terminal of the counter 60. The "and" network 108 has input terminals connected to the phase shift network 16 and through the line 89 from the third terminal of the counter 60. The "and" network 95 has input terminals connected to the phase shift network 28 and to the fourth output terminal of the counter 60. The "and" network 97 has input terminals connected to the phase shift network 22 and to the first output terminal of the counter 60. The "and" networks 95, 97, 106 and 108 may be constructed in a manner similar to that formed by the diodes 72 and 76.

The signals passing through the "or" network 104 are introduced to the cathode of a diode 110 associated with a diode 112. A positive voltage is applied from the source 82 to the plates of the diodes 110 and 112 through a suitable resistance 114. The cathode of the diode 112 is connected to the left output terminal of the flip-flop 96. The cathode of the diode 110 is connected to the plate of a diode 116 and to one terminal of a resistance 118 having its other terminal grounded.

The voltage across the resistance 118 is introduced to the grid of a tube 120. A positive voltage is applied from the source 82 to the plate of the tube and the cathode of the tube 120 is connected to one terminal of a resistance 122 having its other terminal grounded. A connection is also made from the cathode of the tube 120 to the cathode of a diode 124 having its plate connected to one terminal of a capacitance 126. The other terminal of the capacitance 126 has common connections with the cathode of the diode 116 and the output terminal of the amplifier 56.

A positive voltage is applied to the plate of the diode 124 through a resistance 130 from the voltage source 82. A resistance 132 and a diode 134 are in series across the resistance 130 such that the cathode of the diode 134 is connected to the resistance 130 and the plate of the diode is connected to the resistance 132. The plate of the diode 134 also has a common connection with the plate of a diode 136.

The cathode of the diode 136 is connected to the voltage source 82 to receive a positive voltage having a lower amplitude than the potential applied to such members as the resistances 130 and 132. A capacitance 138 and a resistance 140 are in series between the plate of the diode 134 and ground. The cathode of a diode 142 is connected to the common terminal between the capacitance 138 and the resistance 140. The voltage on the plate of the diode 142 is introduced to the left input terminal of the flip-flop 96.

The oscillator 10 in FIGURE 1 is adapted to generate signals at a particular frequency such as approximately 150 cycles per second when an accuracy of one yard is desired in a range of approximately 200,000 yards between the antenna 48 and the distant object. The signals generated by the oscillator 10 and filtered and operated upon in other ways to have substantially a sinusoidal configuration. The signals from the oscillator 10 are introduced to the doubler 12 which acts upon the signals to produce signals having a frequency such as approximately 300 cycles per second. The doubler 18 in turn produces signals at approximately 600 cycles per second.

Each of the succeeding doublers such as the doublers 32 and 34 acts upon the signals introduced to it to produce signals having a frequency substantially twice as great as the frequency of the introduced signals. The signals produced by each of the doublers may have substantially sinusoidal wave shapes. When an accuracy of approximately one yard in a range of approximately 200,000 yards is desired, the doubler 34 may produce signals at a frequency such as 30 megacycles per second.

The signals from the oscillator 10 and each of the doublers such as the doublers 12, 18, 32 and 34 are introduced to the linear mixer 40. The mixer combines these signals without distortion and without the production of beat frequencies to produce signals indicated at 200 in FIGURE 4. Each of the signals 200 has a sharp leading edge 202 and a trailing edge 204 which is considerably more shallow in slope than the leading edge.

The signals 200 are amplified in the stages 42 and introduced to the differentiator 44. The stage 44 differentiates the signals 200 to produce signals having, at any instant, amplitudes dependent upon the rate of change of the signals 200 at that instant. Since the leading edges 202 of the signals 200 are quite sharp, the differentiator 44 acts to produce spiked signals 206 when the leading edges 202 of the signals 200 are introduced to the differentiator. The spiked signals 206 have amplitudes considerably greater than the amplitudes of signals 208 produced by the differentiator 44 when the trailing edges 204 of the signals 200 are introduced to the differentiator. This results from the relatively shallow slope which occurs in the trailing edges 204 of the signals 200.

The triggering signal produced by the differentiator 44 is introduced to the magnetron 46 to trigger the magnetron into a state of oscillation. The magnetron 46 produces oscillatory signals at a relatively high frequency for a relatively short period of time. This causes the oscillatory signals produced by the magnetron 46 to have an envelope in the shape of a pulse. These oscillatory signals are introduced to the antenna 48 for transmission by radiation therefrom. When the oscillatory signals strike an object removed from the antenna 48, the signals are reflected by the object in a manner similar to that obtained in radar systems now in use.

The signals reflected from the distant object reach the receiver 50 in FIGURE 2. The signals reaching the receiver 50 are introduced to the detector 52 which acts upon these signals to remove the oscillatory signals produced by the magnetron 46. In this way, the signals passing through the detector 52 are in the form of a pulse representing the envelope of the signals transmitted by the antenna 48 and reaching the receiver 50. The leading edge of the pulse from the detector 52 is differentiated by the differentiator 54 to produce a sharply spiked signal having a positive amplitude.

The sharp signal of positive amplitude from the differentiator 54 is amplified by the stages 56 and introduced to the delay line 58. The line 58 delays the signal from the amplifier 56 by a particular period of time, which is preferably relatively short. For example, this period of time may be in the order of one microsecond. After being delayed, the signal from the delay line 58 is fed back to the amplifier 56 for passage through the amplifier and for subsequent introduction to the delay line. In this way, the amplifier 56 and the delay line 58 operate to produce signals periodically. These periodic signals may be considered as clock signals for purposes of the subsequent discussion.

The clock signals produced by the amplifier 56 and the delay line 58 are introduced to the counter 60 to trigger the counter. Since the counter 60 is constructed in a conventional manner from a plurality of flip-flops in a cascade arrangement, the counter operates to indicate in binary form the number of signals introduced to the counter from the amplifier 56. For each count, the counter 60 operates to produce a relatively high voltage on a different output terminal. For example, the counter 60 provides a relatively high voltage on the line 77 for an indication in binary form of the decimal value "1" and a relatively high voltage on the line 87 for an indication in binary form of the decimal value "2" and so on.

Upon the introduction of the first signal to the counter 60, an indication in binary form of the decimal value "1" is produced by the counter. This causes a relatively high voltage to be introduced through the line 77 to the cathodes of the diodes 74 and 76 in FIGURE 3. When a relatively high voltage is introduced to the cathode of the diode 74, the "and" network formed by the diodes 70 and 74 becomes prepared for operation. The "and" network formed by the diodes 70 and 74 actually operates to produce a signal when a signal of positive polarity is introduced to the cathode of the diode 70 from the frequency doubler 34 at the time that a high voltage is introduced to the cathode of the diode 74 from the pulse counter 60.

The "and" network formed by the diodes 70 and 74 operates upon the simultaneous introduction of high voltages to the cathodes of the diodes since these high voltages prevent current from flowing through a circuit including the voltage source 82, the resistance 80 and the diodes. Since no current is flowing through the resistance 80, a voltage drop is not produced across the resistance. This causes the voltages on the plates of the diodes 70 and 74 to approach the voltage from the source 82.

Because of the relatively high voltage on the plates of the diodes 70 and 74, current flows through a circuit including the diode 83, the "or" network 84 and the resistance 94. The current flowing through the resistance 94 produces a relatively high voltage across the resistance. Because of the relatively high voltage produced across the resistance 94, relatively high voltages are introduced to the plates of the diodes 90 and 92.

In addition to the high voltages introduced to the plates of the diodes 90 and 92, voltages are also introduced to the cathodes of the diodes. For example, relatively high voltages may be simultaneously introduced to the cathodes of the diodes 92 and 90 from the amplifier 56 and the left output terminal of the flip-flop 96. Because of the high voltages on the cathodes of the diodes 90 and 92, current cannot flow through the diodes even though the voltage on the plates of the diodes may be high. Since current cannot flow through the diodes 90 and 92, the voltage on the plates of the diodes remains relatively high.

The high voltage introduced to the cathode of the diode 92 occurs only on an instantaneous basis because it represents a clock signal corresponding to the received pulse. During the occurrence of this clock signal, the positive voltage produced on the plates of the diodes 90 and 92 causes current to flow through the resistance 94. This current produces a relatively high voltage across the resistance 94.

At the end of the signal from the amplifier 56, the voltage on the cathode of the diode 92 drops to a relatively low value. Since the voltage on the plate of the diode 92 would now be greater than the voltage on the cathode of the diode, current flows through the diode. The flow of current through the diode 92 causes a relatively low impedance to be produced across the diode. This low impedance causes the voltage on the plate of the diode 92 to drop to a value approaching the low voltage on the cathode of the diode.

The low voltage produced on the plate of the diode 92 causes the current flowing through the resistance 94 to become interrupted or at least limited such that a relatively low voltage is produced across the resistance. Since the voltage across the resistance 94 changes from a relatively high value to a relatively low value, a negative signal is produced on the plates of the diodes 90 and 92. This negative signal is differentiated by the capacitance 98 and the resistance 99 to produce across the resistance 99 a relatively sharp triggering signal of negative polarity.

The negative triggering signal produced across the resistance 99 passes through the diode 97 because of the particular manner in which the diode is connected in the circuit. The signal then passes to the right input terminal of the flip-flop 96. The signal triggers the flip-flop 96 into its "false" state for the production of a relatively high voltage on the right output terminal on the flip-flop and a low voltage on the left output terminal of the flip-flop.

The above discussion has proceeded on the basis of a relatively high voltage on the left output terminal of the flip-flop 96 and on the basis of a positive signal from the frequency doubler 34. It may sometimes happen that the phase of the signal from the frequency doubler 34 is such that the signal has a negative amplitude at the time that a relatively high voltage is produced on the line 77. When this occurs, current flows through a circuit including the source 82, the resistance 80, the diode 70 and the resistance 73.

The voltage drop produced across the resistance 80 by the flow of current causes a relatively low voltage to be applied to the plate of the diode 83. This low voltage is in turn applied through the "or" network 84 to the plates of the diode 90 and 92. Since the voltage on the plates of the diodes 90 and 92 is relatively low, a relatively low voltage is produced across the resistance 94. This prevents the voltage across the resistance 94 from decreasing at the end of the signal from the amplifier 56. Since a negative signal is not produced across the resistance 94 at the end of the signal of the amplifier 56, no triggering signal can be produced by the action of the capacitance 98 and the resistance 99. This prevents a triggering signal from passing through the diode 97 to trigger the flip-flop 96 to its "false" state.

A relatively low voltage on the left output terminal of the flip-flop 96 produces the same result as described in the preceding paragraph. This low voltage causes a low voltage to be introduced to the cathode of the diode 90 and a low voltage to be produced on the plate of the diode because of the flow of current through the diode. This low voltage limits any flow of current through the resistance 94 and prevents a high voltage from being produced across the resistance. Because of this, the voltage across the resistance 94 remains substantially constant at the end of the clock signal from the amplifier 56. Since a constant voltage is produced across the resistance 94, a negative triggering signal cannot be produced by the action of the capacitance 98 and the resistance 99. This prevents a signal from passing through the diode 97 to trigger the flip-flop 96 to its "false" state.

The cathodes of the diodes 72 and 76 receive the signals from the frequency doubler 34 and the pulse counter 60 in a manner similar to the diodes 70 and 74. Because of this, a relatively high voltage is produced on the plates on the plates of the diodes 72 and 76 at the same time that a relatively high voltage is produced on the plates of the diodes 70 and 74. This high voltage causes current to flow through a circuit including the diode 102 the "or" network 104 and the resistance 118. The flow of current through the resistance 118 produces a relatively high voltage across a resistance for introduction to the grid of the tube 120.

The high voltage introduced to the grid of the tube 120 makes the tube conductive such that current flows through a circuit including the voltage source 82, the tube and the resistance 122. This current produces a high voltage across the resistance 122 for introduction to the cathode of the diode 124. Since a high voltage is introduced to the cathode of the diode 124, only a limited current can flow through a circuit including the voltage source 82, the resistance 130, the diode and the resistance 122. Because of the limited flow of current through the resistance 130, a relatively low voltage drop is produced across the resistance. For this reason, a relatively high voltage is applied to the cathode of the diode 134.

When a relatively high voltage is applied to the cathode of the diode 134, the voltage on the cathode of the diode exceeds the voltage on the plate. The relatively low voltage on the plate of the diode 134 is produced by a flow of current through a circuit which includes the voltage source 82, the resistance 132 and the diode 136. Since the voltage on the cathode of the diode 134 is greater than the voltage on the plate, the cathode of the diode can receive a negative signal without having its potential drop below that of the plate.

A negative signal is produced at the end of the clock signal from the amplifier 56 and is introduced through the capacitance 126 to the cathode of the diode 134. Since the cathode of the diode 134 cannot swing negative with respect to the plate of the diode at the end of the clock signal from the amplifier 56, a negative signal cannot be produced on the plate of the diode. This prevents a signal from passing through the capacitance 138 and the diode 142 to the left input terminal of the flip-flop 96. In this way, the flip-flop 96 cannot be triggered to its "true" state upon the simultaneous introduction of relatively high voltages to the cathodes of the diodes 72 and 76.

It may sometimes happen that the cathode of the diode 72 may receive a negative signal from the frequency doubler 34 at the time that the cathode of the diode 76 has a relatively high voltage introduced to it from the counter 60. When this occurs, current flows through a circuit including the voltage source 82, the resistance 100, the diode 72 and the resistance 73. This current produces a voltage drop across the resistance 100 and causes a relatively low voltage to be produced on the plates of the diodes 72 and 76.

The low voltage on the plates of the diodes 72 and 76 in turn causes a relatively low voltage to be produced across the resistance 118. Because of the relatively low voltage across the resistance 118, the tube 120 remains cut off and prevents current from flowing through the resistance 122 to produce a positive voltage across the resistance. This low voltage is introduced to the cathode of the diode 124.

Upon the introduction of a low voltage to the cathode of the diode 124, a relatively large current is able to flow through a circuit including the voltage source 82, the resistance 130, the diode 124 and the resistance 122. This current produces a relatively large voltage drop across the resistance 130 such that a relatively low voltage is introduced to the cathode of the diode 134. As previously described, a relatively low voltage is also introduced to the plate of the diode 134 because of the flow of current through a circuit including the voltage source 82, the resistance 132 and the diode 136.

Since the voltages on the cathode and plate of the diode 134 are both relatively low, the voltage on the cathode of the diode is able to fall below the voltage on the diode plate at the end of the clock signal from the amplifier 56. The voltage on the plate of the diode 134 follows the decrease in the voltage on the cathode to produce a negative signal. This signal is differentiated by the action of the capacitance 138 and the resistance 140 to produce a negative triggering signal. The negative triggering signal passes through the diode 142 to the left input terminal of the flip-flop 96. The signal triggers the flip-flop 96 to its "true" state to produce a relatively high voltage on the left output terminal of the flip-flop and a relatively low voltage on the right output terminal of the flip-flop.

The above discussion relating to the introduction of a triggering signal to the left input terminal of the flip-flop 96 has proceeded on the basis of the existence of a relatively low voltage on the left output terminal of the flip-flop. When a relatively high voltage is introduced to the cathode of the diode 112 from the left output terminal of the flip-flop 96, this voltage controls the output of the network formed by the diodes 110 and 112. This high voltage produces a flow of current through the resistance 118 and a resistant flow of current through the tube 120 and the resistance 122 in a manner similar to that described above.

The flow of current through the resistance 122 causes a relatively high voltage to be produced across the resistance and on the cathode of the diode 124. This high voltage is transferred to the cathode of the diode 134 in a manner similar to that described above. The high voltage on the cathode of the diode 134 prevents a signal from passing through the diode at the end of the clock signal from the amplifier 56. A signal cannot pass to the flip-flop 96 regardless of the operation of any of the logical networks shown at the bottom of FIGURE 3. These networks include the "and" network formed by the diodes 72 and 76 and the "and" networks 106 and 108. It will be seen from the above discussion that a triggering signal can pass to the right input terminal of the flip-flop 96 only when a relatively high voltage is produced on the left output terminal of the flip-flop. Furthermore, a triggering signal can pass to the left input terminal of the flip-flop 96 only upon the prior production of a relatively low voltage on the left output terminal of the flip-flop. For this reason the flip-flop 96 determines whether the "and" networks in the upper portion of FIGURE 3 or the "and" networks in the lower portion of FIGURE 3 are to control the introduction of input signals to the flip-flop.

Just as the flip-flop 96 controls whether the "and" networks in the lower or upper portion of FIGURE 3 are to pass triggering signals, the pulse counter 60 controls the particular "and" network which is activated. For example, the flip-flop 96 may provide by its operation for the passage of a triggering signal from any one of the "and" networks 86, 88 or 91 or the network formed by the diodes 70 and 74. However, the pulse counter 60 operates to activate only the "and" network 86 upon an indication in binary form of the decimal value "2." In this way, the counter 60 operates to obtain an activation of the different "and" networks on a sequential basis in accordance with the advance of the count in the counter.

It may be seen from the above discussion that triggering signals are introduced to the right input terminal of the flip-flop 96 in accordance with the following logical equation:

$$\overline{m}_1 = (P_1 S_1^* + P_2 S_2^* + \ldots P_n S_n^*) MC \qquad (1)$$

where $\overline{m}_1 =$ a triggering signal introduced to the right input terminal of the flip-flop 96;

$P_1 =$ a relatively high voltage on the line 77 to indicate a count of "1" in the counter 60;

$S_1^* =$ a signal of positive polarity from the frequency doubler 34;

$P_2 =$ a relatively high voltage on the line 87 to indicate a count of "2" in the counter 60;

$S_2^* =$ a signal of positive polarity from the plate shift network 36;

$P_n =$ a relatively high voltage on the line 89 to indicate a count of "n" in the counter 60;

$S_n^* =$ a signal of positive polarity from the phase shift network 14;

$M =$ a relatively high voltage on the left output terminal of the flip-flop 16; and $C =$ a clock signal from the amplifier 56.

As is well known in computer terminology, the "+" sign indicates an "or" relationship which would cause an $\overline{m}_1$ triggering signal to be produced when any of the terms such as $P_1 S_1^*$, $P_2 S_2^*$, etc. become true.

A logical equation can also be developed from the above discussion to indicate the introduction of triggering signals to the left input terminal of the flip-flop 96. This logical equation is as follows:

$$(m_1)_L = P_1 S_1^* + P_2 S_2 + \ldots P_n S_n + M)C \qquad (2)$$

where $(m_1)_L =$ the lack of introduction of a signal to the left input terminal of the flip-flop 96 upon the occurrence of any of the terms within the parentheses to the right of the "equal" (=) sign;

$S_2 =$ a signal of positive polarity from the phase shift network 38;

$S_n =$ a signal of positive amplitude from the phase shift network 16; and the other terms have previously been defined.

It should be appreciated that the flip-flop 96 not only controls the selection of the particular phase shift network in the successive pair of networks but also provides signals representing the output from the networks. These indications are represented by the pattern of high and low voltages on the right output terminal of the flip-flop 96. A low voltage on the right output terminal of the flip-flop 96 represents a value of "0" for a particular binary digit and a high voltage on the right output terminal of the flip-flop represents a value of "1" for the binary digit.

The operation of the apparatus will now be explained with reference to a particular example such as that shown in FIGURE 5. In this example, the signals produced by the oscillator 10 and the frequency doublers such as the stages 12, 18, 32 and 34 in FIGURE 1 have a particular phase relationship at the time that the reflected pulse reaches the receiver 50. As may be seen in FIGURE 5, a relatively high voltage indicated at 220 may exist on the left output terminal of the flip-flop 96 before the reception of the reflected pulse. This causes the networks shown at the top of FIGURE 3 to become prepared for activation. These networks include the "and" networks 86, 88 and 91 and the "and" network 73 formed by the diodes 70 and 74.

When the reflected pulse reaches the receiver 50 in FIGURE 2, a signal is produced by the amplifier 56 in a manner similar to that described above. This signal is indicated at 222 in FIGURE 5. Upon the occurrence of the signal 222, a relatively high voltage passes from the counter 60 through the line 77 to the cathodes of the diodes 74 and 76. Since a relatively high voltage exists on the left output terminal of the flip-flop 96, only the "and" network formed by the diodes 70 and 74 can produce a triggering signal.

In the example set forth in FIGURE 5, the signal from the frequency doubler 34 has a negative polarity at the time that a high voltage is produced on the line 77. This prevents a signal from passing to the right input terminal of the flip-flop 96 as described fully above. Because of this, a relatively high voltage continues to exist on the left output terminal of the flip-flop 96 as illustrated at 224 in FIGURE 5. Since a relatively high voltage is produced on the left output terminal of the flip-flop 96, a relatively low voltage is produced on the right output terminal of the flip-flop, as indicated at 226 in FIGURE 5.

After a particular time, the clock signal 222 produced by the amplifiers 56 circulates through the delay line 58 for introduction to the input terminal of the amplifier. This causes a second clock signal to be produced by the amplifier, as indicated at 228 in FIGURE 5. Upon the production of the clock signal 228, a relatively high voltage is produced by the counter 60 on the line 87. This voltage is introduced to the "and" networks 86 and 106 to prepare the "and" networks for activation.

Because of the relatively high voltage on the left output terminal of the flip-flop 96, only the "and" network 86 can be effective in obtaining the passage of a triggering signal to the flip-flop. At the time that a relatively high voltage is produced on the line 87, the signal from the phase shift network 36 may have a positive polarity. The shift in phase provided by the network 36 may be related to the frequency of the signals introduced to the network and to the time between the signals 222 and 228. In this way, the network 36 operates to compensate for any errors which might result from the time interval between the received pulse and the production of the second clock signal 228.

Because of the simultaneous introduction of relatively high voltages to the input terminals of the "and" network 86 in FIGURE 3, a signal passes through the "and" network. This signal causes a triggering signal to be produced by the resistances 94 and 99 and the capacitance 98 in a manner similar to that described above. The triggering signal passes to the right input terminal of the flip-flop 96 and triggers the flip-flop to its "false" state. In the "false" state of operation of the flip-flop 96, a relatively high voltage is produced on the right output terminal of the flip-flop, as indicated at 230 in FIGURE 5, and a relatively low voltage is produced on the left output terminal of the flip-flop, as indicated at 232 in FIGURE 5.

After a particular period of time, the amplifier 56 and the delay line 58 operate to produce a third clock signal 234. When the clock signal 234 is produced, it causes the "and" network 95 to become prepared for activation. The "and" network 95 is prepared for activation because of the relatively low voltage on the left output terminal of the flip-flop 96.

In the example shown in FIGURE 5, a signal of positive polarity is introduced to the "and" network 95 from the associated phase shift network 28. As described above, the occurrence of a signal of positive polarity from the associated phase shift network prevents a triggering signal from passing to the left input terminal of the flip-flop 96. This causes the relatively high voltage to be maintained on the right output terminal of the flip-flop 96, as indicated at 236 in FIGURE 5. Because of the relatively high voltage on the right output terminal of the flip-flop 96, a relatively low voltage is maintained on the left output terminal of the flip-flop 96, as indicated at 238 in FIGURE 5.

In like manner, signals are produced on the right output terminal of the flip-flop 96 upon the production of successive clock signals to indicate in digital form the time between the transmission of a pulse and the reception of the pulse reflected from a distant object. As shown in FIGURE 5, a relatively low voltage may be produced on the left output terminal of the flip-flop 96 when the signals in the phase shift networks 20 and 22 are tested for their polarity. The low voltage on the left output terminal of the flip-flop 96 may be indicated at 240. Since a relatively low voltage is produced on the left output terminal of the flip-flop 96, a relatively high voltage indicated at 242 is simultaneously produced on the right output terminal of the flip-flop.

A clock signal 244 may be produced by the operation of the amplifier 56 and the delay line 58 after the low voltage 240 has been obtained on the left output terminal of the flip-flop 96. When the clock signal 244 is produced, a high voltage is introduced from the pulse counter 60 through the line 89 to the "and" networks 88 and 108. Since a relatively low voltage is produced on the left output terminal of the flip-flop 96, only the "and" network 108 can become activated.

In the example shown in FIGURE 5, a signal of negative polarity is introduced to the "and" network 108 from the phase shift network 16 at the time that a high voltage is produced on the line 89. The network 16 operates on the signals from the oscillator 10 to shift the phase of the signals through an angle dependent upon the frequency of the signals and upon the total delay between the reception of the reflected pulse and the production of the clock signal 244.

Since the "and" network 108 receives a signal of negative polarity from the network 16 at the time that it becomes prepared for activation, a triggering signal passes to the left input terminal of the flip-flop 96 in a manner similar to that described above. This signal triggers the flip-flop 96 to its true state as represented by a relatively high voltage on the left output terminal of the flip-flop 96. This voltage is indicated at 248 in FIGURE 5. Because of the production of a relatively high voltage on the left output terminal of the flip-flop 92, a relatively low voltage is produced on the right output terminal of the flip-flop, as indicated at 250 in FIGURE 5.

The signals produced on the right output terminal of the flip-flop 96 represent in digital form the time between the transmission of a pulse toward the distant object and the reception of the pulse reflected from the distant object. Each successive signal has a weighted effect twice as great as the effect of the previous signal. For example, the first three signals produced on the right output terminal of the flip-flop 96 are indicated at 226, 230 and 236 in FIGURE 5 and are intended to represent digital indications of 011, where the least significant digit is at the left. This is equivalent to $(2^0)$ $(0) + (2^1)$ $(1) + (2^2)$ $(1) = 6$. By determining the time between the transmitted and reflected pulses, the distance between the antenna 48 in FIGURE 1 and the distant object can be determined by a simple conversion factor. A digital display unit 252 is coupled to the right output terminal of the flip-flop 96. This unit, for example, may be constructed in well known manner to include a plurality of flip-flops. These flip-flops may all be initially set to their false state. Then, under the control of the pulse counter 60, a logic path is prepared to successive ones of the flip-flops. Whenever the flip-flop 96 is set true during the particular successive intervals, the corresponding flip-flops in the unit 252 are respectively set true. Appropriate indicating means may be coupled to the flip-flops in the display unit 252 so that the states of the flip-flops at the termination of the measuring interval may be indicated. These states, of course, will correspond to the successive states of the flip-flop 96 during the measuring interval.

The apparatus described above has several important advantages. The apparatus produces a timing signal at an optimum instant in accordance with a particular phase relationship between a signal at a fundamental and a plurality of harmonic frequencies. It then uses this timing signal to produce a pulse for transmission toward a distant object and for reflection from the object. In this way, the time from the transmission of the pulse can be accurately measured.

The apparatus is also advantageous in that it requires a minimum number of stages with wide band characteristics. Because of this, power amplification can be obtained without any need for a large number of intermediate stages. This causes savings to be obtained in space, weight, cost and power consumption. It also permits the use of transistors since transistors at present do not have wide band characteristics. By using transistors, further savings in cost, weight, complexity and power consumption can be obtained.

A further advantage is obtained by producing output signals on a digital basis. As is well known, digital representations provide more accuracy than analog representations such as single voltages. The digital representations are obtained without any possibilities of ambiguity resulting from occurrences of signals from the oscillator 10 and the frequency doublers such as the stages 12, 18, 32 and 34 at the time that the signals are changing in polarity. This results from the use of the particular type of converter shown in FIGURE 3 and described fully above.

I claim:

1. In combination: generating means for providing signals at a fundamental frequency and particular harmonic frequencies, means coupled to the generating means and responsive to the signals at the fundamental frequency and at the particular harmonic frequencies for combining these signals to produce a timing signal, means coupled to the combining means and responsive to said timing signal for producing a pulse for transmission to a distant object, means for receiving a reflected pulse from the distant object produced by reflection of the transmitted pulse thereby, and means responsive to the reflected pulse and to the phases of the signals at the fundamental and harmonic frequencies at the time of the reception of the reflected pulse to provide digital indications as to the time between the production of the timing signal and the reception of the reflected pulse.

2. In combination: generating means for providing a fundamental signal at a fundamental frequency and for providing particular harmonic signals having frequencies at respective harmonics of the fundamental frequency, means coupled to the generating means for combining the signals to produce a resultant timing signal, means coupled to the combination means for differentiating the resultant signal to produce a relatively sharp triggering signal, means coupled to the differential means and responsive to the triggering signal for producing a pulse for transmission to a distant object, means for receiving a reflected pulse from the object produced by reflection of the transmitted pulse thereby, means coupled to the receiving means and responsive to the reflected pulse for producing a circulation of the reflected pulse at spaced intervals of time to provide a series of clock pulses, and means responsive to the clock pulses to test the phase of the harmonic and fundamental signals in order of their decreasing frequency.

3. In combination: generating means for providing signals at a fundamental frequency and at particular harmonic frequencies, means coupled to the generating means for combining the signals at the fundamental frequency and at the particular harmonic frequencies to produce a timing signal, means coupled to the combining means and triggered by the timing signal for producing a pulse for transmission to a distant object, means for receiving a reflected pulse from the object produced by reflection of the transmitted pulse thereby, means coupled to the receiving means and responsive to the reflected pulse for producing clock signals at periodic intervals after the reception of the reflected pulse, and means responsive to the clock signals and to the signals at the fundamental frequency and at the particular harmonic frequencies for determining the phase of the signals at the fundamental and harmonic frequencies upon the occurrence of the successive clock signals to provide a plurality of signals digitally representing the time between the production of the timing signal and the reception of the reflected pulse.

4. In combination: generating means for providing a plurality of oscillatory signals having frequencies whose values are geometrically related to one another, combining means coupled to the generating means and responsive to the plurality of oscillatory signals for producing a triggering signal, means coupled to the combining means and responsive to the triggering signal for producing a pulse for transmission to a distant object; means for receiving a reflected pulse from the distant object produced by reflection of the transmitted pulse thereby, means coupled to the receiving means and responsive to the reflected pulse for producing clock signals periodically after such reception, and means coupled to said generating means and to said last-mentioned producing means and responsive to the phase of successive oscillatory signals in the plurality during successive occurrences of the clock signals to provide a plurality of ouptut signals digitally representing the time between the occurrence of the triggering signal and the reception of the pulse from the distant object.

5. In combination: generating means for providing a first plurality of signals having frequencies whose values are geometrically related to one another, combining means coupled to the generating means for combining the signals of said plurality upon the occurrence of a particular phase relationship of such signals to produce a pulse for transmission toward a distant object, means for receiving a reflected pulse from the removed object to the transmitted pulse means for receiving the pulse from the distant object produced by reflection of the transmitted pulse thereby, means coupled to the receiving means for producing a series of regularly timed clock pulses in response to said reflected pulse, and means coupled to said generating means and to said last-mentioned producing means and responsive to said clock pulses and to phases of said signals of said first plurality to produce a series of signals digitally representing the phase of the signals in the first plurality at the time of reception of the pulse from the removed object.

6. In combination: generating means for providing a first plurality of signals having frequencies whose values are geometrically related to one another, means coupled to said generating means responsive to the signals of the first plurality for producing a relatively sharp triggering signal, means coupled to said producing means and responsive to the triggering signal to produce a pulse for transmission toward a distant object, receiving means for receiving a reflected pulse from the object produced by the reflection thereby of the transmitted pulse, means coupled to the receiving means responsive to the reflected pulse received by the receiving means for producing regularly recurring timing signals, a bistable member, and means coupled to said generating means and to the timing signal-producing means for sequentially activating the bistable member upon the production of the timing signals and in accordance with the phases of the signals in the first plurality to provide a plurality of output signals representing in digital form the time between the production of the triggering signal and the reception of the reflected pulse.

7. In combination: generating means including a series of networks for respectively producing signals having frequencies whose values are geometrically related to one another, means coupled to said generating means for producing a trigger signal, means coupled to said trigger signal producing means and responsive to said trigger signal for producing a pulse for transmission toward a distant object, means for receiving a reflected pulse from the distant object produced by the transmitted pulse, means coupled to said receiving means and responsive to said reflected pulse for producing periodic timing signals, means including a plurality of pairs of "and" network means respectively coupled to said series of networks, means coupled to said timing signal-producing means for sequentially preparing said pair of "and" network means for activation, a bistable network, and means coupled to said "and" network means for triggering said bistable network between two stable states in response to signals derived from said "and" network means.

8. In combination: generating means including a plurality of frequency doubler networks for respectively producing signals at a fundamental frequency and at a plurality of harmonic frequencies, means coupled to said generating means and responsive to the signals produced thereby for producing a trigger signal, means coupled to said trigger signal-producing means and responsive to said trigger signal for producing a pulse for transmission toward a distant object, means for receiving a reflected pulse from the distant object produced by the transmitted pulse, means coupled to said receiving means and responsive to said reflected pulse for producing a series of regularly recurring clock pulses, means including a plurality of pairs of "and" networks respectively coupled to said frequency doubler networks, means including a counter network coupled to said timing signal-producing means for sequentially preparing said pairs of "and" networks for activation, a bistable network, and means coupled to said "and" networks for triggering said bistable network between two stable states in response to signals derived from said "and" networks.

9. In combination: generating means for providing signals having a fundamental frequency and harmonic frequencies whose values are geometrically related to one another, means coupled to said generating means and responsive to the signals having the fundamental frequency and the harmonic frequencies for combining these signals to produce a trigger signal upon the occurrence of a particular phase relationship in the fundamental and harmonic frequencies, means coupled to said combining means and responsive to the trigger signal to produce an energy pulse for transmission toward a distant object, means for receiving from the object a reflected pulse produced by the transmitted pulse, a plurality of pairs of phase shifting networks coupled to said generating means for producing at each of the fundamental and harmonic frequencies a pair of signals separated in phase from each other by a particular value, means coupled to said receiving means and responsive to the reflected pulse for producing regularly recurring timing signals, means including a plurality of "and" networks respectively coupled to said pairs of phase-shift networks, means coupled to said timing signal-producing means for sequentially preparing said pairs of "and" networks for activation, a bistable network, and circuit means coupled to said "and" networks for triggernig said bistable network between two stable states in response to signals derived from said "and" networks.

10. In combination: generating means for providing signals at a fundamental frequency and at a plurality of harmonic frequencies whose values are geometrically related to the fundamental frequency and to one another, means coupled to said generating means and responsive to the signals at the fundamental frequency and at the harmonic frequencies for shifting the phase of each of such signals to provide at each frequency a pair of signals having a particular phase relationship to each other, means coupled to said generating means and responsive to the signals at the fundamental and harmonic frequencies for combining such signals to produce a trigger signal, means coupled to said combining means and responsive to said trigger signal for producing a pulse for transmission towards a distant object, means for receiving from the distant object of a reflected pulse produced by the transmitted pulse, a bistable member having first and second states of operation, a plurality of "and" networks respectively coupled to said phase shifting means to receive respective ones of the pairs of signals at the fundamental and at the harmonic frequencies and each paired with the "and" network receiving the other signal at the same frequency, means coupled to said receiving means and to the "and" networks in the plurality for sequentially selecting successive pairs of such "and" networks, and means coupled to said "and" networks in the plurality and to said bistable member for triggering said bistable member in accordance with the phase of the signal introduced to the sequentially selected pairs of "and" networks in the plurality.

11. In combination: generating means for producing signals at a fundamental frequency and at a plurality of harmonic frequencies whose values are geometrically related to the fundamental frequency and to one another, means coupled to said generating means and responsive to the signals at the fundamental frequency and at the harmonic frequencies for shifting the phase of each of such signals to provide at each frequency a pair of signals having a particular phase relationship to each other, means coupled to said generating means and responsive to the signals at the fundamental and harmonic frequencies for combining such signals to produce a trigger signal, means coupled to said combining means and responsive to said trigger signal for producing a pulse for transmission toward a distant object, means for receiving from the distant object a reflected pulse produced by the transmitted pulse, means coupled to said receiving means and responsive to the received pulse for producing periodic timing signals, counter means coupled to said last named means and responsive to the periodic timing signals for producing successive selecting signals, a bistable member having first and second states of operation, a plurality of "and" networks respectively coupled to said phase shifting means to receive respective ones of the pairs of signals at the fundamental and at the harmonic frequencies and coupled to said counter, to receive the selecting signals from the counter means, coupled to said counter means, each of the "and" networks in the plurality being paired with the "and" network in the plurality receiving the other signal at the same frequency and the pairs of "and" networks being successively selected by said selecting signals, and means coupled to the "and" networks in the plurality for triggering the bistable member in accordance with the phase of the respective signals from said phase shifting means to the "and" networks of the successively selected pairs of "and" networks in the plurality.

12. In combination: generating means for providing signals at a fundamental frequency and particular harmonic frequencies, means coupled to the generating means and responsive to the signals at the fundamental frequency and the harmonic frequencies for combining these signals to produce a trigger signal, means coupled to the combining means and responsive to said trigger signal for producing a pulse for transmission to a distant object, means for receiving from the object a reflected pulse produced by the transmitted pulse, means coupled to the generating means and operative upon the signals at the fundamental and particular harmonic frequencies for providing at these frequencies pairs of signals in which the signals in each pair have a particular phase relationship to each other, means coupled to said last-named means and to said receiving means and successively operative upon the pair of signals at each frequency and responsive to the received pulse for successively selecting particular ones of said pairs of signals, and means coupled to said last-named means and responsive to successively selected signals therefrom for providing an output indication in accordance with the phase relationship of said signals at the fundamental and harmonic frequencies at the time of the reception of the reflected pulse from the distant object.

13. In combination: generating means for providing oscillatory signals at a fundamental frequency and at particular harmonics of the fundamental frequency, means coupled to the generating means and responsive to the oscillatory signals for transmitting a pulse to a distant object, means for receiving a reflected pulse from the distant object produced by the transmitted pulse, phase-shifting means coupled to said generating means for imparting phase-shifts to the oscillatory signals, means coupled to said receiving means and responsive to said reflected pulse for producing a series of timing signals related to the relative timing of the phase-shifted oscillatory signals, and network means coupled to said phase-shifting means and to said timing signal-producing means for producing output signals representative of the phase relationship of said fundamental and harmonic oscillatory signals at the time of reception of said reflected pulse by said receiving means.

14. A system for determining the time interval between a first pulse and a second pulse time-spaced from the first pulse, the system including: first means for producing oscillatory signals at a fundamental frequency and at particular harmonic frequencies of the fundamental frequency, circuit means coupled to said first producing means for developing said first pulse when said oscillatory signals at said fundamental and harmonic frequencies have a particular reference phase relationship, phase-shifting means coupled to said first producing means for imparting predetermined phase shifts to said oscillatory signals at said harmonic frequencies, second means for producing said second pulse, generating means coupled to said second producing means for producing a series of timing pulses in response to said second pulse, and further circuit means coupled to said phase-shifting means and to said timing pulse generating means for producing an output signal digitally indicating the relative phases of the oscillatory signals at the time of production of said second pulse.

15. A system for determining the time interval between a first pulse and a second pulse time-spaced from the first pulse, the system including: first means for producing oscillatory signals at a fundamental frequency and at particular harmonic frequencies of the fundamental frequency, circuit means coupled to said first producing means for developing said first pulse when said oscillatory signals at said fundamental and harmonic frequencies have a particular reference phase relationship, a plurality of phase-shifting networks coupled to said first producing means for imparting predetermined phase shifts to said oscillatory signals at said fundamental frequency and at successive ones of said harmonic frequencies, second means for producing said second pulse, generating means coupled to said second producing means for developing a series of timing pulses in response to said second pulse and having a timing related to the phase shifted oscillatory signals at said fundamental frequency and at said successive ones of said harmonic frequencies, and further circuit means coupled to said phase-shifting networks and to said timing pulse generating means for producing an output signal digitally representing the relative phases at the time of production of the second pulse of the oscillatory signals at said fundamental and harmonic frequencies.

16. A system for determining the time interval between a first pulse and a second pulse time-spaced from the first pulse, the system including: first means for producing oscillatory signals at a fundamental frequency and at particular harmonic frequencies of the fundamental frequency, circuit means coupled to said first producing means for developing said first pulse when said oscillatory signals at said fundamental and harmonic frequencies have a particular reference phase relationship, a plurality of pairs of phase-shifting networks coupled to said first producing means for imparting predetermined respective first and second phase shifts to said oscillatory signals at said fundamental frequency and at successive ones of said harmonic frequencies excepting the highest one of said harmonic frequencies, second means for producing said second pulse, generating means coupled to said second producing means for developing a series of timing pulses in response to said second pulse and having a timing related to the phase shifted oscillatory signals at said fundamental frequency and at said successive ones of said harmonic frequencies, and further circuit means including a bistable network coupled to said phase-shifting networks and to said first producing means and to said timing pulse generating means for producing an output signal digitally representing the relative phases at the time of production of the second pulse of the oscillatory signals at said fundamental and harmonic frequencies.

17. A system for determining the time interval between a first pulse and a second pulse time-spaced from the first pulse, the system including: first means for producing oscillatory signals at a fundamental frequency and at particular harmonic frequencies of the fundamental frequency, circuit means coupled to said first producing means for developing said first pulse when said oscillatory signals at said fundamental and harmonic frequencies have a particular reference phase relationship, a plurality of pairs of phase-shifting networks coupled to said first producing means for imparting predetermined respective first and second phase shifts to said oscillatory signals at said fundamental frequency and at successive ones of said harmonic frequencies, second means for producing said second pulse, generating means coupled to said second producing means for developing a series of timing pulses in response to said second pulse and having a timing related to the phase shifted oscillatory signals at said fundamental frequency and at successive ones of said harmonic frequencies, a first plurality of "and" networks respectively coupled to a first of the phase-shifting networks of respective ones of said pairs, a second plurality of "and" networks respectively coupled to a second of the phase-shifting networks of respective ones of said pairs, and circuit means including a bistable network coupled to said first and second plurality of "and" networks and to said timing pulse generating means for producing an output signal digitally representing the relative phases at the time of production of the second pulse of the oscillatory signals at said fundamental and harmonic frequencies.

18. A system for determining the difference in time between first and second pulses and for producing a plurality of output signals digitally representing such differences, means for developing an oscillatory signal having a fundamental frequency and particular harmonics of the fundamental frequency, first means coupled to the signal developing means for producing a said first pulse at a time corresponding to a particular phase relationship of said fundamental and harmonics, second means for producing said second pulse, means coupled to said second producing means for generating a plurality of timing pulses at spaced intervals of time after the production of the second pulse, and means coupled to said second producing means and to said timing pulse generating means and responsive to the second pulse and to successive ones of said timing pulses for determining the relative phases of the harmonics and the fundamental in the oscillatory signal and for providing such a determination in the order of decreasing frequency of the particular harmonics and the fundamental frequency to produce a plurality of output signals digitally representing the separation in time between the first and second pulses.

19. A system for determining the difference in time between first and second pulses and for producing a plurality of output signals representing such differences, means for developing signals at a fundamental frequency and at particular harmonic frequencies, means coupled to said developing means and responsive to the signals at the fundamental frequency and at the harmonic frequencies for combining these signals to produce the first pulse, a plurality of paired phase-shifting means coupled to said developing means and responsive to the signals at said fundamental frequency and at said harmonic frequencies for producing at each of the fundamental and harmonic frequencies a pair of phase-shifted signals, means for producing said second pulse, means coupled to said last named producing means and responsive to the second pulse for periodically generating a series of timing pulses, first circuit means coupled to said last named producing means and to said timing pulse generating means and responsive to the pairs of phase-shifted signals and to the timing pulses for producing control signals indicative of the relative phases of the fundamental and harmonics of the oscillatory signal, and second circuit means including a bistable network coupled to said first circuit means for producing an output signal digitally representing the separation in time between the first pulse and the second pulse.

20. In combination as set forth in claim 14, including electrical circuitry responsive to the first pulse for transmitting a pulse toward a distant object for reflection from the distant object of a pulse produced by the transmitted pulse, and in which said second producing means is responsive to the pulse from the distant object to produce the second pulse.

References Cited in the file of this patent

UNITED STATES PATENTS

| | | |
|---|---|---|
| 2,433,385 | Miller | Dec. 30, 1947 |
| 2,506,818 | Sziklai | May 7, 1950 |
| 2,621,238 | Palmer | Dec. 9, 1952 |
| 2,811,717 | Palmer | Oct. 29, 1957 |
| 2,860,331 | Pridmore et al. | Nov. 11, 1958 |

FOREIGN PATENTS

| | | |
|---|---|---|
| 132,518 | Australia | May 26, 1949 |